United States Patent Office 3,636,106
Patented Jan. 18, 1972

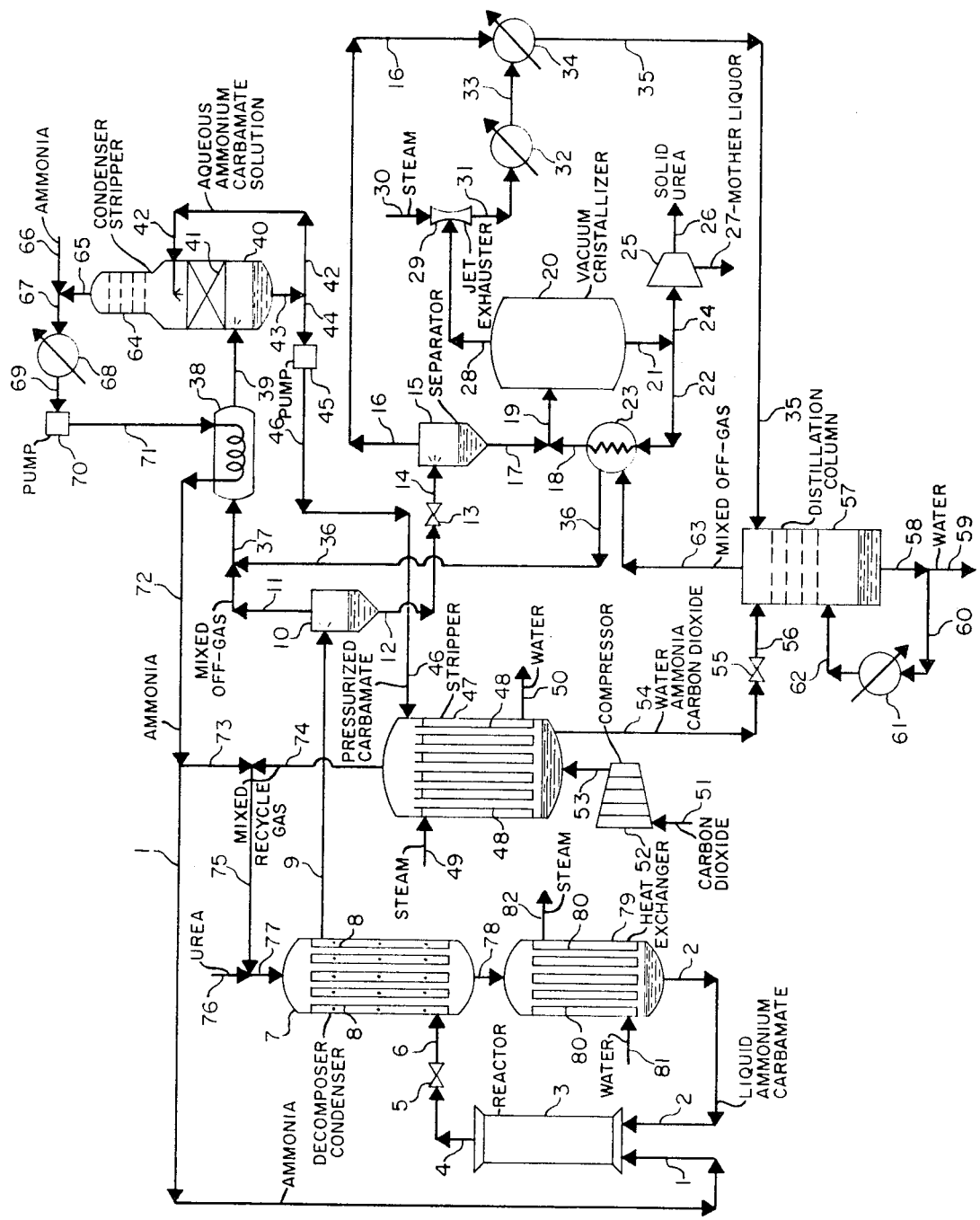

3,636,106
PROCESS FOR UREA SYNTHESIS
John F. Villiers-Fisher, Kendall Park, and Philip F. Kaupas, Old Bridge, N.J., assignors to Chemical Construction Corporation, New York, N.Y.
Filed Sept. 12, 1968, Ser. No. 759,371
Int. Cl. C07c *127/00*
U.S. Cl. 260—555 A        28 Claims

ABSTRACT OF THE DISCLOSURE

A process for the high pressure synthesis of urea from ammonia and carbon dioxide is provided, in which recycle aqueous ammonium carbamate solution is pressurized and stripped with feed carbon dioxide, preferably at or slightly above urea synthesis reactor pressure. The stripping step is carried out in a heat exchange zone which is externally heated to decompose ammonium carbamate, so that a high pressure off-gas principally containing carbon dioxide and ammonia is produced from the stripping step, together with a liquid effluent principally consisting of water, which may be discarded or processed to recover ammonia values. Feed ammonia is preferably added to the high pressure off-gas from stripping, to produce a combined process stream having an ammonia to carbon dioxide molar ratio of about 2:1, which is passed through a decomposer-heat exchange zone to heat effluent from the urea synthesis reactor, thus decomposing ammonium carbamate in the urea synthesis effluent and producing an off-gas which is processed to produce the aqueous ammonium carbamate solution. The combined process stream may cool during condensation, depending on the ammonia to carbon dioxide ratio in the decomposer-heat exchange zone, however the principal effect on the combined process stream is condensation of molten ammonium carbamate, to produce a gas-liquid mixture of low or negligible water content. The resulting process stream containing condensed ammonium carbamate is passed to urea synthesis. In an alternative embodiment of the invention, the combined process stream produced by adding ammonia to the stripper off-gas may be cooled in heat exchange with liquid water which is vaporized to produce steam, which may be employed in a separate unit to heat the urea synthesis effluent and decompose ammonium carbamate.

BACKGROUND OF THE INVENTION

Field of the invention

The invention relates to recycle-type urea synthesis processes in which urea is produced by the reaction of ammonia and carbon dioxide at elevated pressure, to produce a urea synthesis effluent containing urea, water, ammonium carbamate and usually containing excess ammonia, and in which the off-gas from heating of the urea synthesis effluent to vaporize unreacted ammonium carbamate and ammonia is processed to produce an aqueous ammonium carbamate solution for recycle to urea synthesis.

Description of the prior art

Urea is synthesized from ammonia and carbon dioxide, typically at 210 kg./sq. cm. and 190° C., using an overall ammonia to carbon dioxide mole ratio of about 4:1. The reaction proceeds through the initial formation of ammonium carbamate, a portion of which is dehydrated to yield urea. The synthesis reactor effluent thus contains urea, water, ammonium carbamate and excess ammonia. The reactor effluent is heated at reduced pressure to decompose ammonium carbamate and produce a mixed off-gas containing ammonia, carbon dioxide and water vapor, together with product aqueous urea solution, which is further processed to produce solid urea crystals or prills. A part of the unreacted mixed off-gas is recycled in an aqueous ammonium carbamate solution having a water content such that the feed ratio of water to carbon dioxide in the overall synthesis reactor feed is about 0.6 to 1 on a molar basis. Since water is one of the products of the urea synthesis reaction, the synthesis conversion to urea is reduced from the theoretical value of about 77% to about 67%.

The pressure of the reactor effluent is reduced, typically to 21 kg./sq. cm., and the effluent is then heated to about 160° C. About 90% of the unreacted ammonia and carbon dioxide are evaporated at 21 kg./sq. cm. Off-gas may be generated by adiabatic flash evaporation due to pressure reduction, as described in U.S. Pat. No. 3,172,911 and U.S. patent application No. 521,921, filed Jan. 20, 1966 and issued as U.S. Pat. No. 3,527,799. Some energy is recovered during the condensation of the vapors, typically by the procedures described in U.S. Pats. Nos. 3,147,304 and 3,137,725. Typical usages for the energy are as a heat source for second stage decomposition at about 2.1 kg./sq. cm., for heating the urea solution in the crystallizer, or for feed ammonia preheat.

The partially condensed vapors or off-gas from the 21 kg./sq. cm. evaporation or carbamate decomposition and the off-gas from the 2.1 kg./sq. cm. evaporation are collected in water in two absorbers and recycled to the reactor as concentrated aqueous ammonium carbamate solution. Much of the ammonia from the evaporation stages, especially the first stage evaporation at 21 kg./sq. cm., is stripped of carbon dioxide in a tower and condensed as nearly pure ammonia. Off-gas treatment procedures are described in U.S. Pats. Nos. 3,155,722; 3,155,723 and 3,191,916.

The stripping of unreacted components from the urea synthesis effluent employing ammonia or carbon dioxide as the stripping medium, so as to produce a stripped product aqueous urea solution, is described in U.S. Pats. Nos. 2,056,283; 3,046,307; 3,049,563; 3,301,897 and 3,356,725 and Canadian Pat. No. 787,960. The use of mixed off-gases for stripping is described in Canadian Pat. No. 736,-520 and U.S. Pat. No. 3,072,721; and the use of inert gas or air for stripping is described in U.S. Pats. Nos. 2,267,-133; 2,087,325 and 3,120,563.

SUMMARY OF THE INVENTION

The stripping process of the present invention is applicable to any urea process using a recycle aqueous ammonium carbamate solution. Energy reuse techniques as practiced in the present process scheme may change significantly with changes in the ammonia to carbon dioxide ratios in the reactor feed. The energy reuse techniques control the overall energy requirements. The features of the present invention include the combination of high pressure carbon dioxide stripping of aqueous ammonium carbamate solution, with the condensation of the resulting mixed off-gas to ammonium carbamate melt at high pressure, to heat or drive other parts of the process. The process of the invention features the selection and high pressure stripping of a carbamate-bearing, urea-free process stream which is relatively insensitive to process conditions. Thus, the present invention avoids the problems attendant upon stripping of the urea bearing solutions, where residence at the temperatures required and at reactor pressures is critical, with respect to urea hydrolysis and/or biuret formation.

In the present invention, the recycle aqueous ammonium carbamate solution typically derived from the 4:1 liquid recycle urea process is stripped of ammonium carbamate and ammonia employing the carbon dioxide feed stream, preferably at or somewhat above reactor pressure and at temperatures such that relatively complete stripping can be achieved. The pressure of the steam in the heating steam jacket disposed about the stripping zone should generally exceed 14 kg./sq. cm. and is limited only by the economics of jacket construction and corrosion of the stripper as the wall temperature exceeds 190° C. Presently practical steam pressures are 20 kg./sq. cm. up to the 40 kg./sq. cm. steam available from the usual associated ammonia plant.

The overhead vapors are adjusted to near the maximum condensation temperature mixture, which is roughly 2 mols ammonia per mol of carbon dioxide, by ammonia addition. In general, the major portion of the vapors are condensed before going to the reactor. The heat of condensation is preferably employed in part to decompose ammonium carbamate in the reactor effluent and evaporate carbon dioxide, ammonia and some water from the reactor effluent at reduced pressure, the preferred pressure range being about 15 kg./sq. cm. to about 55 kg./sq. cm. The residual excess heat derived from carbamate condensation in the overhead vapor stream, above the requirement for decomposition of ammonium carbamate in the reactor effluent, is employed to generate 3 to 6 kg./sq. cm. steam. Alternatively, a major portion of the heat of carbamate condensation could be converted to steam, with part of the steam being used to decompose ammonium carbamate in the reactor effluent.

The stripper liquid underflow, consisting mostly of water, will generally contain some ammonia and carbon dioxide, with the quantity depending on local economics. This material is recovered by distillation in a still. In a preferred embodiment of the invention, all the water removed from the product aqueous urea solution is condensed and is employed to absorb all of the ammonia and carbon dioxide removed from the urea synthesis effluent at low pressure. This solution is also passed to the same still for distillation. In an alternative, the high pressure stripper bottoms can be stripped in the high pressure unit to the point where only carbon dioxide and water remain in the liquid phase, and the effluent is then discarded. In any case, the still distillation overhead passes ultimately to the high pressure absorber which produces the aqueous ammonium carbamate solution.

A significant part of the heat content of the mixed off-gas or vapors derived from the decomposition of ammonium carbamate in the reactor effluent is recovered by heating the high pressure ammonia feed to the reactor. These vapors and/or the still vapors mentioned supra can also be used to provide the heat requirements for the urea crystallizer. These vapors can also be used as a heat source in a low pressure stripper, to remove the residual ammonia in the reactor effluent.

The admixing of the high pressure stripper overhead with ammonia can be used to control the extent of carbamate decomposition and evaporation in the reactor effluent. By adjusting the ammonia feed rate to move the molar ratio away from 2:1, the condensation temperature is reduced. This lowering of the temperature driving force reduces the amount of carbamate decomposition in the reactor effluent and cocomitant evaporation or generation of mixed off-gas. This is an advantage when this decomposer is sized for the fouled condition but is on line in a nearly clean condition.

In an alternative embodiment of the invention, the high pressure stripping step can be modified by admixing enough carbon dioxide into the aqueous ammoniacal ammonium carbamate solution to react with same of the free ammonia in solution and heat solution to feed tray temperatures. The heat of reaction due to a further excess of carbon dioxide addition and ammonium carbamate formation could be absorbed in heat exchange with the ammonia feed stream. The end result is improved system performance, but with higher high pressure steam consumption and a higher export of low pressure steam. This modification may be justified on the bases of the local market for such low pressure steam, which may be employed as a heat source for solution heating or the like.

The process of the present invention provides numerous advantages. The reduction in the water content of the recycled ammonium carbamate, and consequent reduction in the water level during urea synthesis, raises the reactor conversion from 67% to 75%. This reduces the energy requirement for evaporation about 25%.

The equipment for the high pressure stripping process is sized to a large extent on the basis of the available temperature driving force. The advantage of processing the recycle aqueous ammonium carbamate solution in the stripper is that the film temperatures can be much higher than when processing the reactor effluent since urea decomposition is not a problem. Presently the allowable steam pressure is limited to about 35 kg./sq. cm. because of corrosion of titanium or stainless steel by the ammonium carbamate. However, modified titanium or stainless or other alloys could permit operation with much hotter heating media, the choice being primarily based on economic considerations.

The stripper operating pressure is variable over a wide range. The operating pressure is preferably slightly above reactor pressure, in order to avoid the necessity of pumping hot condensed ammonium carbamate, to eliminate any restrictions on both the stripper and the condenser locations since pressure is available to drive the liquid to the reactor, and to minimize the stripper skin temperature to permit the use of alloys such as 316 L. The condensation temperature permits the generation of 7 kg./sq. cm. steam. Higher operation pressures are possible, particularly with higher stripper jacket temperatures, and steam regeneration may take place at much higher pressures. Reprocessing the recycle carbamate solution therefore lends itself to the multiple reuse of energy. At very high condensing temperatures, liquid residence must be minimized to avoid byproduct formation beyond the urea stage.

In most instances, direct transfer of heat will be provided between the condensing ammonium carbamate and the reactor effluent in a heat exchanger. This relationship may be modified, for instance steam could be generated first and then the generated steam could be used to evaporate the ammonia and carbon dioxide from the reactor effluent. In this latter step, effluent liquor residence in the exchanger, film temperature and free ammonia partial pressures define to a large extent the biuret formation and urea hydrolysis ratio. Consequently, at high carbamate condensing temperatures, the intermediate generation of steam may be preferred as an alternative to the design of a special condensing carbamate-reactor effluent heat exchanger.

The flexibility in ammonium carbamate condensing temperatures simplifies the design of the higher pressure evaporation and absorption step, since high reuse temperatures permit equivalent evaporation at high pressures, which simplifies the second reuse of the high pressure steam and the ultimate condensation of the excess ammonia. A final advantage of the recycle of nearly dry molten ammonium carbamate is a significant reduction in reactor volume.

It is an object of the present invention to provide an improved process for the synthesis of urea.

Another object is to provide an improved process for the recycle of aqueous ammonium carbamate solution to urea synthesis.

A further object is to dehydrate aqueous ammonium carbamate solution in an improved manner, prior to recycle to urea synthesis.

An additional object is to utilize high pressure feed carbon dioxide in an improved manner, to strip aqueous ammonium carbamate solution for recycle to a urea synthesis process.

Still another object is to reduce the proportion of water recycled to a urea synthesis process in which mixed off-gas is processed to produce an aqueous ammonium carbamate solution.

Still a further object is to provide an improved heat source for decomposition of ammonium carbamate in a urea synthesis reactor effluent.

An object is to strip aqueous ammonium carbamate solution at high pressure with feed carbon dioxide in a urea synthesis process, and thereby eliminate water from the system and produce a high pressure gas stream which, when adjusted to a suitable ammonia to carbon dioxide molar ratio by ammonia addition, is usable as a high temperature heat source via ammonium carbamate condensation at high pressure.

An object is to increase conversion in the urea synthesis reactor by reducing the water content of the recycle ammonium carbamate solution.

An object is to separate ammonia and carbon dioxide from the aqueous ammonium carbamate solution by stripping with carbon dioxide at pressures such that the overhead mixed gas stream condenses at useful temperature levels for energy reuse, preferably at or above reactor pressures.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the process of the invention is presented. Preheated ammonia feed stream 1 and recycle stream 2 containing ammonium carbamate at least partially in the liquid state are passed into urea synthesis reactor 3, which is generally a high pressure autoclave or the like. An elevated pressure generally in the range of 100 kg./sq. cm. to 350 kg./sq. cm. and preferably in the range of 135 kg./sq. cm. to 270 kg./sq. cm. is maintained within unit 3, together with an elevated temperature generally in the range of 150° C. to 220° C. The overall molar feed ratio of ammonia to carbon dioxide is maintained within unit 3 in a range generally between 2:1 and about 8:1, and under these operating conditions the synthesis of urea by dehydration of ammonium carbamate takes place within unit 3. The dehydration reaction reaches equilibrium and total conversion to urea is not obtained in unit 3 in commercial practice, and consequently the effluent stream 4 discharged from the urea synthesis reactor or zone 3 contains urea, water, ammonium carbamate and excess ammonia. Stream 4 is passed through pressure reducing valve 5, and the resulting effluent stream 6, which is now at a reduced pressure below 100 kg./sq. cm. and generally in the range of 15 kg./sq. cm. to 55 kg./sq. cm., is passed into the shell of heat exchanger-decomposer 7 and rises external to the tubes 8, which may be provided with suitable external baffles. The synthesis effluent process stream is heated in the shell of unit 7, and a portion of the ammonium carbamate in the process stream is decomposed, with the resultant formation of a gaseous phase containing ammonia, carbon dioxide and water vapor.

The resulting gas-liquid mixture formed in the shell of unit 7 is discharged from the upper portion of unit 7 via stream 9, which passes to gas-liquid separator 10 for separation of the gaseous phase from the residual urea-containing liquid phase. Unit 10 is a gas-liquid separator of conventional design, and may consist of a baffled or cyclonic unit. The separated gaseous phase is removed from unit 10 via stream 11, which is processed for the formation of an aqueous ammonium carbamate solution in a manner to be described infra. The residual urea-containing liquid phase is removed from unit 10 via stream 12, which is passed through pressure reducing valve 13, which discharges the resulting stream 14 at a reduced pressure in the range of 1 kg./sq. cm. to 5 kg./sq. cm.

Due to the reduced pressure of stream 14, a gaseous phase is evolved in stream 14, which is separated into gaseous and residual liquid phases by passing stream 14 into gas-liquid separator 15. Unit 15 is similar to unit 10 described supra, and separates the evolved off-gas phase stream 16 from the residual liquid phase stream 17. Stream 16 contains ammonia and carbon dioxide together with a small proportion of water vapor, and is processed for recycle and recovery of ammonia values as will be described infra.

Stream 17 now consists primarily of an aqueous urea solution containing minor dissolved proportions of ammonia and carbon dioxide, and is now processed in any suitable manner to recover product solid urea. Stream 17 is preferably combined with recycle stream 18 which is derived in a manner to be described infra, and the resulting combined stream 19 is passed into vacuum crystallizer 20 for the formation of solid urea crystals by the removal of water as vapor, together with residual amounts of ammonia and carbon dioxide. The resulting slurry stream 21 removed from the bottom of unit 20 now consists of solid urea crystals entrained in a saturated aqueous mother liquor solution. Stream 21 is now preferably divided into two portions, with recycle portion stream 22 being heated in heat exchange 23 and recycled via stream 18. The balance of stream 21 passes via stream 24 to centrifuge or crystal filter 25, from which product solid urea crystals stream 26 passes to product utilization. In some cases stream 26 may be passed directly to product usage as a fertilizer, in plastics manufacture, or the like, however stream 26 may alternatively be dried, melted and prilled to form urea prills for fertilizer usage. The residual mother liquor stream 27 removed from unit 25 may be recycled to unit 20 or further utilized in the process as will appear infra. In some instances, stream 21 may be initially processed to produce a dense slurry which is utilized as stream 24, and a clear liquor which is recycled via stream 22.

Returning to unit 20, an overhead vapor phase stream 28 principally containing water vapor together with residual ammonia and carbon dioxide is inducted into steam jet exhauster 29, through which stream 30 is passed and expanded to induct stream 28 and provide a vacuum in unit 20. The resulting combined stream 31 discharged from unit 29 is cooled and may be at least partially condensed in heat exchanger 32, which is provided with cooling water or other suitable coolant. The resulting cooled stream 33 is combined with stream 16 in cooler-condenser 34, which condenses all or a major portion of the combined streams to the liquid state. The resulting liquid stream 35 is processed to recover ammonia values as will appear infra.

Returning to unit 10, the overhead mixed off-gas stream 11 is combined with recycle stream 36, which is derived in a manner to be described infra and contains ammonia, carbon dioxide and water, with these components being present in stream 36 at least partially in a condensed liquid phase. The resulting hot combined stream 37, which is elevated in temperature due to the formation of ammonium carbamate in the liquid phase, is cooled and partially further condensed to the liquid state in heat exchanger 38. The resulting mixed gas-liquid stream 39 now passes into condenser-stripper unit 40, which is an apparatus and has a function similar to these described in U.S. Pats. Nos. 3,155,723 and 3,191,916. The liquid portion of stream 39 passes downwards and joins the liquid body in the bottom portion of unit 40, while the gaseous portion of stream 39 flows upwards through gas scrubbing and condensation section 41, which is typically a bed of suitable spherical, ring or saddle-type packing for efficient gas-liquid contact. In some instances, section 41 may consist of sieve trays, bubble cap plates or the like. In any case, cold liquid stream 42 consisting of an aqueous ammoniacal ammonium carbamate solution is passed into unit 40 above section 41, and flows downwards through section 41 countercurrent to the rising gas phase, thus serving to scrub dioxide from the gas phase as a condensed ammonium carbamate. The resulting aqueous ammonium carbamate solution which collects in the bottom of unit 40 and usually contains residual free ammonia is withdrawn via stream 43. A portion of the stream 43 is recycled via stream 42, which may be cooled in an external heat exchanger, not shown, prior to recycle to unit 40 above section 41.

The balance of stream 43, consisting of stream 44, is recycled to urea synthesis in accordance with the present invention. Stream 44 is pumped and pressurized in pump 45, which pressurizes the aqueous ammonium carbamate solution to an elevated pressure which is usually slightly greater than the urea synthesis pressure in unit 3, and in any case is generally in the range of about 30 kg./sq. cm. to 350 kg./sq. cm., and preferably in the range of 100 kg./sq. cm. to 350 kg./sq. cm. The resulting pressurized stream 46 discharged from unit 45 is now passed to stripper-heat exchanger 47 for the removal of ammonium carbamate by high pressure stripping with feed carbon dioxide, which removes water from the system and produces a high pressure mixed gas stream in accordance with the present invention.

Stream 46 flows downwards through the tubes 48 in unit 47. The tubes 48 are externally heated, typically by passing a hot fluid stream 49 which usually consists of high pressure steam external to the tubes 48, with cooled fluid or condensed water being removed via stream 50. The external heating of tubes 48 promotes the internal decomposition of ammonium carbamate derived from stream 46 and the formation of a gaseous phase containing ammonia and carbon dioxide at elevated pressure within the tubes 48. A temperature typically in the range of about 200° C. to about 250° C. is maintained within unit 47 by stream 49. Feed carbon dioxide gas is introduced into the bottom of unit 47, tyipcally by compressing feed carbon dioxide gas stream 51 in compressor 52 to an elevated pressure, usually slightly higher than urea synthesis pressure and generally comparable to the pressure of stream 46, and passing the resulting compressed carbon dioxide gas stream 53 into the bottom of unit 47, so that the feed carbon dioxide gas rises through the tubes 48 and strips ammonia and carbon dioxide from the downflowing aqueous liquid solution within tubes 48. A residual aqueous phase consisting mostly of water collects in the bottom of unit 47, and is withdrawn via stream 54. In some instances, stream 54 may have a negligible content of dissolved ammonia and is discharged to waste. However, in this preferred embodiment of the invention, stream 54 is further processed to recover dissolved ammonia and carbon dioxide values.

Stream 54 is passed through pressure reducing valve 55, an the resulting aqueous stream 56, now at a reduced pressure typically in the range of 15 kg./sq. cm. to 55 kg./sq. cm., is passed into ammonia recovery still 57 together with stream 35, which was produced from processing as described supra. In most instances, stream 35 as produced is at a pressure below 15 kg./sq. cm., and therefore stream 35 is pressurized by passing through a pump, not shown, prior to flowing into unit 57. Still 57 is a distillation column or still, which boils and refluxes the vapors from the aqueous feed streams 56 and 35 at a pressure typically in the range of 15 kg./sq. cm. to 55 kg./sq. cm. and temperature in the range of 150° C. to 230° C., in order to separate an overhead vapor stream rich in ammonia from waste water. The depleted waste water stream 58 is withdrawn from the bottom of unit 57, and a portion of stream 58 is discarded as discharged waste water stream 59. In some instances, heat may be recovered from hot water stream 59 by passing stream 59 in heat exchange with stream 35, prior to final discharge of stream 59 to waste. The balance of stream 58 is passed via stream 60 to reboiler-heat exchanger 61 for heating and partial vaporization in heat exchange with steam, and the resulting mixed vapor-liquid stream 62 is recycled to unit 57 below the upper reflux trays section. A final hot overhead vapor stream 63 is removed from the top of unit 57. Stream 63 is rich in recovered ammonia values, and also contains carbon dioxide and water vapor. Stream 63 is initially passed through heat exchanger 23 and in heat exchange with stream 22 is described supra. At least a portion of stream 63 condenses to liquid in unit 23, and the resulting cooled stream 36 containing a condensed liquid phase is combined with stream 11 and recycled to further processing as described supra, for conversion to aqueous ammonium carbamate solution and purified overhead ammonia vapor in unit 40.

Returning to condenser-stripper unit 40, the rising gas phase above section 41 is now of depleted carbon dioxide content and consists mostly of ammonia vapor. This gas phase rises through reflux-stripping section 64, as described in the U.S. Pats. Nos. 3,155,723 and 3,191,916, and a resulting residual purified ammonia vapor phase stream 65 is withdrawn from the top of unit 40. Stream 65 is combined with feed ammonia stream 66, and the combined ammonia stream 67 is preferably cooled and totally condensed in heat exchanger 68 by heat exchange with cooling water. The resulting liquid ammonia stream 69 is pressurized by pump 70 to an elevated pressure typically in the range of 100 kg./sq. cm. to 350 kg./sq. cm., and the pressurized liquid ammonia stream 71 discharged from unit 70 is heated in heat exchanger 38 by heat exchange with process stream 37. The heated high pressure ammonia stream 72 is now preferably divided into stream 1, which is passed to urea synthesis as described supra, and stream 73, which is utilized in accordance with the present invention.

Stream 73 is now preferably combined with hot mixed gaseous stream 74, which is derived from the tubes 48 of unit 47 as the resulting hot gas stream produced by the stripping of aqueous ammonium carbamate solution with gaseous carbon dioxide in unit 47. In most instances, the proportion of added ammonia stream 73 to mixed hot gas stream 74 will be such that the resulting combined process stream 75 has a molar ammonia to carbon dioxide ratio in the range of about 1.5:1 to about 3:1, and for optimum results in terms of subsequent maximum temperature levels during ammonium carbamate condensation, the molar ammonia to carbon dioxide ratio in stream 75 is substantially 2:1. Urea stream 76 is now preferably added to stream 75, in order to promote the initial condensation processes. In most cases, stream 76 will consist of aqueous urea solution, and may consist of a portion of streams 22 or 27.

The final combined recycle stream 77 produced by the addition of stream 76 to stream 75 is now passed into unit 7 and flows downwards through tubes 8. At least a portion of the ammonia and carbon dioxide content of stream 77 condenses to molten ammonium carbamate of low water content within tubes 8, with the consequent generation and liberation of heat which promotes the decomposition of ammonium carbamate in the urea synthesis effluent stream within the shell of unit 7, and described supra. The recycle process stream discharged downwards from tubes 8 is withdrawn from unit 7 as stream 78, which usually contains both a molten liquid ammonium carbamate phase and a residual gaseous phase.

Stream 78 is now processed for further heat recovery via carbamate condensation, prior to recycle to urea synthesis. Stream 78 is passed downwards into the vertically oriented heat exchanger 79, and flows downwards through tubes 80, in which further condensation of molten ammonium carbamate and heat liberation takes place. A suitable heat exchange fluid stream 81, which usually consists of condensate or boiler feed water, is passed into the shell of unit 79, and heated heat exchange fluid usually consisting of generated high pressure steam is removed via stream 82. The external cooling of tubes 80 by the heat exchange fluid may promote and produce total condensation of the gaseous phase within tubes 80 to liquid. In any case, the resulting process stream discharged downwards from tubes 80 contains a molten liquid ammonium carbamate phase and may consist entirely of molten ammonium carbamate of low water content. This resulting process stream collects in unit 79 below tubes 80, and is withdrawn via stream 2 and passed to urea synthesis as described supra. In most instances, as mentioned supra, the pressure of the process streams from which stream 2 is derived, specifically streams 53, 46 and 73, will be slightly higher than the urea synthesis pressure in reactor 3, and consequently the hot molten ammonium carbamate stream 2 will flow directly into reactor 3, without any necessity for the provision of a pump to force stream 2 into reactor 3. This is highly advantageous, since a special pump for pumping hot ammonium carbamate stream 2, which is a molten salt, is therefore not required.

Numerous alternatives within the scope of the present invention, besides those mentioned supra, will occur to those skilled in the art. In some instances, the invention may be practiced outside of some of the ranges of process variables such as temperature and pressure mentioned supra, however such ranges constitute preferred embodiments of the invention. Stream 14 may be heated prior to passing into unit 15, in order to promote final ammonium carbamate decomposition and generation of off-gas, by heat exchange with streams 11 or 36. Stream 17 may alternatively be processed by multiple effect evaporation, to produce a substantially anhydrous urea melt for direct prilling. In this respect, the concepts of U.S. Pats. Nos. 3,211,788 and 3,147,174 may be employed.

In some instances it will be advantageous to add carbon dioxide at high pressure to stream 46, since stream 46 usually contains excess free ammonia. In this case, the added carbon dioxide will react with the free ammonia in stream 46 to produce in situ formation of ammonium carbamate with consequent temperature elevation. The resultant hot process stream may then be passed in heat exchange with stream 72, to provide further heating of feed ammonia, or may be passed directly into unit 47 at elevated temperature, thus reducing the heating requirements for unit 47. In some instances the stripping pressure level in the tubes 48 of unit 47 may be below urea synthesis reactor pressure. In this case, stream 74 may be compressed prior to combining with stream 73. In some instances, such as when a high proportion of free ammonia is present in stream 46, stream 73 may be omitted and stream 75 will be derived only from stream 74, however in most cases stream 73 will be provided in order to produce the requisite molar ammonia to carbon dioxide ratio in stream 75 for optimum temperature levels and heat generation. As mentioned supra, the feed rate of stream 73 may be varied from that which would provide the optimum 2:1 molar ratio of ammonia to carbon dioxide in stream 75. This modification would be desirable during initial periods of operation when the heat exchange surfaces in units 7 and 79 are clean and the tubes 8 and 80 are clear. As fouling occurs during sustained operating runs, and heat transfer rates become lowered, the feed rate of stream 73 relative to stream 74 may be modified to produce a 2:1 molar ammonia to carbon dioxide ratio in stream 75, which would tend to promote subsequent ammonium carbamate condensation and heat release at maximum temperature levels.

Finally, the condensation of molten ammonium carbamate as practiced in the present invention may be employed solely to generate steam or for other heat exchange purposes besides the heating of the urea synthesis effluent stream 6. In this case, stream 77 would be passed directly into unit 79 and would bypass unit 7. The hot stream 82 generated in the shell of unit 79 and usually consisting of high pressure steam would then be partly or totally employed for heating purposes in unit 7, and would be passed through the tubes 8. This alternative is advantageous when portions of stream 77 initially condense to molten ammonium carbamate at very elevated temperatures, which could cause biuret formation and urea hydrolysis in the urea synthesis effluent stream if direct heat transfer from stream 77 to stream 6 is provided.

An example of an application of the present invention to the design of a commercial urea production facility will now be described.

EXAMPLE

Following are the compositions and operating conditions for principal process streams in the process of the present invention, as applied to the design of a commercial urea synthesis facility. Compositions are expressed in moles per mole of urea in the reactor effluent stream 4.

| Stream No. | Content of component, moles/mole urea | | | | Absolute pressure, kg./sq. cm. | Temp. (° C.) |
|---|---|---|---|---|---|---|
| | Carbon dioxide | Ammonia | Water | Urea | | |
| 53 | .953 | | | | 228.2 | 176 |
| 66 | | 1.921 | | | 19.3 | 30 |
| 4 | .333 | 3.332 | 1.087 | 1.000 | 224.7 | 195 |
| 11 | .308 | 2.970 | .399 | | 21.05 | 165 |
| 12 | .025 | .362 | .688 | 1.000 | 21.05 | 168 |
| 16 | .019 | .260 | .129 | | 1.12 | 98 |
| 17 | .006 | .102 | .559 | 1.000 | 1.12 | 96 |
| 28 | .006 | .102 | .554 | | 0.105 | 68 |
| 35 | .025 | .362 | 1.019 | | 21.6 | 35 |
| 63 | .072 | .451 | .130 | | 21.4 | 160 |
| 59 | .003 | .021 | 1.352 | | 21.4 | 217 |
| 39 | .380 | 3.421 | .529 | | 21.05 | 77 |
| 46 | .380 | 1.210 | .555 | | 228.3 | 86 |
| 74 | 1.283 | 1.100 | .092 | | 228.1 | 172 |
| 54 | .050 | .110 | .463 | | 228.2 | 206 |
| 76 | | | .025 | .050 | 228.1 | 67 |
| 73 | | 1.466 | .007 | | 228.1 | 127 |
| 2 | 1.283 | 2.566 | .124 | .050 | 228.1 | 127 |
| 1 | | 2.676 | .013 | | 228.1 | 128 |
| 26 | | | .005 | .950 | 1.03 | 38 |

We claim:
1. In a process for the synthesis of urea from ammonia and carbon dioxide in a urea synthesis zone at an elevated pressure in the range of 100 kg./sq. cm. to 350 kg./sq. cm. in which the pressure of the effluent from the urea synthesis zone is reduced below 100 kg./sq. cm., the urea synthesis effluent is heated at reduced pressure in a heat exchanger to decompose ammonium carbamate and generate a mixed off-gas containing ammonia, carbon dioxide and water vapor, the residual liquid effluent is separated from said mixed off-gas and processed to recover product urea, and said mixed off-gas is at least partially condensed to produce an aqueous ammonium carbamate solution, the improved process for recycle of ammonium carbamate to urea synthesis which comprises
 (a) pressurizing said aqueous ammonium carbamate solution to an elevated urea synthesis pressure in the range of 100 kg./sq. cm. to 350 kg./sq. cm.,
 (b) passing said pressurized aqueous ammonium carbamate solution through an externally heated stripping-heat exchange zone,
 (c) passing a gaseous carbon dioxide stream through said stripping-heat exchange zone in contact with said aqueous ammonium carbamate solution, whereby ammonium carbamate is decomposed, ammonia and carbon dioxide are stripped from said solution into said gaseous carbon dioxide stream and a residual solution principally containing water is formed,
 (d) removing said residual solution formed by step (c) from said stripping-heat exchange zone,
 (e) removing the resulting gaseous process stream formed by step (c) from said stripping-heat exchange zone, said resulting gaseous process stream containing ammonia and carbon dioxide components derived from ammonium carbamate decomposition in said zone, together with carbon dioxide derived from said gaseous carbon dioxide stream,
 (f) passing said resulting gaseous process tream through a heat recovery zone in heat exchange with a fluid, whereby at least a portion of said resulting gaseous process stream condenses to liquid ammonium carbamate and thereby releases heat which is absorbed by said fluid, and (g) passing the resulting process stream discharged from said heat recovery zone and containing condensed liquid ammonium carbamate to said urea synthesis zone.

2. The process of claim 1, in which said stripping-heat exchange zone is vertically oriented, said pressurized aqueous ammonium carbamate solution is passed downwards through said zone and said gaseous carbon dioxide stream is passed upwards through said zone.

3. The process of claim 1, in which said residual solution principally containing water and removed according to step (d) also contains a minor proportion of dissolved ammonia, said residual solution is distilled to produce a gaseous stream containing ammonia, and said gaseous stream is added to said mixed off-gas generated by decomposition of ammonium carbamate in said urea synthesis effluent, prior to processing said mixed off-gas to produce said aqueous ammonium carbamate solution.

4. The process of claim 1, in which said heat recovery zone of step (f) comprises said heat exchanger in which ammonium carbamate in said urea synthesis effluent is decomposed, and said fluid of step (f) is said urea synthesis effluent.

5. The process of claim 1, in which ammonia is added to said resulting gaseous process stream removed according to step (e), prior to passing said gaseous process stream through said heat recovery zone, whereby the resulting combined process stream contains ammonia and carbon dioxide in a molar ratio between about 1.5:1 to about 3:1.

6. The process of claim 5, in which ammonia is added to said resulting gaseous process stream in a proportion which produces a resulting combined process stream with an ammonia to carbon dioxide molar ratio of substantially 2:1.

7. The process of claim 1, in which the molar ratio of ammonia to carbon dioxide in said urea synthesis zone is in the range of 2:1 to about 8:1, the pressure in said urea synthesis zone is in the range of 135 kg./sq. cm. to 270 kg./sq. cm., and the pressure of the effluent from the urea synthesis zone is reduced to the range of about 15 kg./sq. cm. to 55 kg./sq. cm.

8. The process of claim 1, in which said fluid passed to said heat recovery zone according to step (f) is water, and said water is evaporated in said heat recovery zone to generate steam.

9. The process of claim 8, in which said generated steam is passed to said heat exchanger to heat said urea synthesis effluent by indirect heat exchange and thereby decompose ammonium carbamate and generate said mixed off-gas.

10. The process of claim 1, in which said residual liquid effluent separated from said mixed off-gas is processed to recover urea by reducing the pressure of said residual liquid effluent, whereby a mixed vapor stream containing ammonia, carbon dioxide and water vapor is evolved from said residual liquid effluent and the resulting liquid phase comprises an aqueous urea solution, and processing said evolved mixed vapor stream to recover ammonia.

11. The process of claim 1, in which a liquid containing urea is added to said resulting gaseous process stream removed according to step (e), prior to passing said gaseous process stream through said heat recovery zone.

12. The process of claim 11, in which said added liquid containing urea is aqueous mother liquor solution derived from a crystallizer in which solid urea is crystallized from aqueous urea solution.

13. The process of claim 1, in which said mixed off-gas derived from the decomposition ammonium carbamate in said urea synthesis effluent and containing ammonia, carbon dioxide and water vapor is at least partially condensed to produce said aqueous ammonium carbamate solution by cooling said mixed off-gas, whereby a portion of said mixed off-gas condenses to the liquid state, scrubbing the residual mixed off-gas with cold aqueous ammoniacal ammonium carbamate solution, whereby carbon dioxide is absorbed into said cold scrubbing solution, combining the resulting cold scrubbing solution with the condensed liquid portion derived from said mixed off-gas, withdrawing a portion of the resulting combined liquid solution as said aqueous ammonium carbamate solution, and further cooling and refluxing the residual mixed off-gas to produce ammonia gas substantially free of carbon dioxide.

14. The process of claim 13, in which said mixed off-gas is initially cooled by heat exchange with a feed stream of liquid ammonia, said liquid ammonia stream being at a pressure in the range of 100 kg./sq. cm. to 350 kg./sq. cm., and the resulting warmed liquid ammonia stream is passed to urea synthesis.

15. The process of claim 14, in which said warmed liquid ammonia stream is divided into a first portion and a second portion, said first portion is added to said resulting gaseous process stream removed according to step (e), prior to passing said gaseous process stream through said heat recovery zone, and said second portion is passed to said urea synthesis zone.

16. In a process for the synthesis of urea from ammonia and carbon dioxide in a urea synthesis zone at an elevated pressure in the range of 100 kg./sq. cm. to 350 kg./sq. cm. in which the pressure of the effluent from the urea synthesis zone is reduced below 100 kg./sq. cm., the urea synthesis effluent is heated at reduced pressure in a heat exchanger to decompose ammonium carbamate and generate a mixed off-gas containing ammonia, carbon dioxide and water vapor, the residual liquid effluent is separated from said mixed off-gas and processed to recover product urea, and said mixed off-gas is at least partially condensed to produce an aqueous ammonium carbamate solution containing free ammonia, the improved process for recycle of ammonium carbamate to urea synthesis which comprises (a) pressurizing said aqueous ammonium carbamate solution to an elevated urea synthesis pressure in the range of 100 kg./sq. cm. to 350 kg./sq. cm., (b) passing said pressurized aqueous ammonium carbamate solution through an externally heated stripping-heat exchange zone, (c) passing a gaseous carbon dioxide stream through said stripping-heat exchange zone in contact with said aqueous ammonium carbamate solution, whereby ammonium carbamate is decomposed, ammonia and carbon dioxide are stripped from said solution into said gaseous carbon dioxide stream and a residual solution principally containing water is formed, (d) removing said residual solution formed by step (c) from said stripping-heat exchange zone, (e) removing the resulting gaseous process stream formed by step (c) from said stripping-heat exchange zone, said resulting gaseous process stream containing ammonia and carbon dioxide components derived from ammonium carbamate decomposition in said zone together with carbon dioxide derived from said gaseous carbon dioxide stream, (f) adding ammonia to said resulting gaseous process stream removed according to step (e), whereby the resulting process stream contains ammonia and carbon dioxide in a molar ratio between about 1.5:1 to about 3:1, (g) passing the resulting process stream formed by step (f) through said heat exchanger in which ammonium carbamate in said urea synthesis effluent is decomposed, whereby said resulting process stream passes in heat exchange with said urea synthesis effluent and at least a portion of said resulting process stream condenses to liquid ammonium carbamate and thereby releases heat which is absorbed by said urea synthesis effluent, and (h) passing the resulting process stream discharged from said heat exchanger and containing condensed liquid ammonium carbamate to said urea synthesis zone.

17. The process of claim 16, in which said stripping-heat exchange zone is vertically oriented, said pressurized aqueous ammonium carbamate solution is passed downwards through said zone and said gaseous carbon dioxide stream is passed upwards through said zone.

18. The process of claim 16, in which said residual solution principally containing water and removed according to step (d) also contains a minor proportion of dissolved ammonia, said residual solution is distilled to produce a gaseous stream containing ammonia, and said gaseous stream is added to said mixed off-gas generated by decomposition of ammonium carbamate in said urea synthesis effluent, prior to processing said mixed off-gas to produce said aqueous ammonium carbamate solution.

19. The process of claim 16, in which ammonia is added to said resulting gaseous process stream according to step (f) in a proportion which produces a resulting process stream with an ammonia to carbon dioxide molar ratio of substantially 2:1.

20. The process of claim 16, in which the molar ratio of ammonia to carbon dioxide in said urea synthesis zone is in the range of 2:1 to about 8:1, the pressure in said urea synthesis zone is in the range of 135 kg./sq. cm. to 270 kg./sq. cm., and the pressure of the effluent from the urea synthesis zone is reduced to the range of about 15 kg./sq. cm. to 55 kg./sq. cm.

21. The process of claim 16, in which the resulting process stream containing condensed ammonium carbamate and formed by step (g) is passed through a heat recovery zone and in heat exchange with water, whereby a further portion of said resulting process stream condenses to liquid ammonium carbamate and thereby releases heat which is absorbed by said water to generate steam, prior to passing said resulting process stream containing condensed liquid ammonium carbamate to said urea synthesis zone.

22. The process of claim 16, in which said residual liquid effluent separated from said mixed off-gas is processed to recover urea by reducing the pressure of said residual liquid effluent, whereby a mixed vapor stream containing ammonia, carbon dioxide and water vapor is evolved from said residual liquid effluent and the resulting residual liquid phase comprises an aqueous urea solution, and processing said evolved mixed vapor stream to recover ammonia.

23. The process of claim 16, in which a liquid containing urea is added to said resulting gaseous process stream removed according to step (e), prior to passing said resulting process stream through said heat exchanger according to step (g).

24. The process of claim 23, in which said added liquid containing urea is aqueous mother liquor solution derived from a crystallizer in which solid urea is crystallized from aqueous urea solution.

25. The process of claim 16, in which said mixed off-gas derived from the decomposition of ammonium carbamate in said urea synthesis effluent and containing ammonia, carbon dioxide and water vapor is at least partially condensed to produce said aqueous ammonium carbamate solution by cooling said mixed off-gas, whereby a portion of said mixed off-gas condenses to the liquid state, scrubbing the residual mixed off-gas with cold aqueous ammoniacal ammonium carbamate solution, whereby carbon dioxide is absorbed into said cold scrubbing solution, combining the resulting cold scrubbing solution with the condensed liquid portion derived from said mixed off-gas, withdrawing a portion of the resulting combined liquid solution as said aqueous ammonium carbamate solution, and further cooling and refluxing the residual mixed off-gas to produce ammonia gas substantially free of carbon dioxide.

26. The process of claim 25, in which said mixed off-gas is initially cooled by heat exchange with a feed stream of liquid ammonia, said liquid ammonia stream being at a pressure in the range of 100 kg./sq. cm. to 350 kg./sq. cm., and the resulting warmed liquid ammonia stream is passed to urea synthesis.

27. The process of claim 26, in which said warmed liquid ammonia stream is divided into a first portion and a second portion, said first portion is added to said resulting gaseous process stream according to step (f), and said second portion is passed to said urea synthesis zone.

28. The process of claim 16, in which carbon dioxide is added to said aqueous ammonium carbamate solution prior to step (b), whereby the added carbon dioxide reacts with free ammonia in said solution and forms further ammonium carbamate in solution and thereby produces an increase in the temperature of said aqueous ammonium carbamate solution.

References Cited
UNITED STATES PATENTS

| | | | |
|---|---|---|---|
| 3,155,722 | 11/1964 | Mavrovic | 260—555 |
| 3,232,983 | 2/1966 | Flinn | 260—555 |
| 3,248,425 | 4/1966 | Ledergerber | 260—555 |
| 3,317,601 | 5/1967 | Otsuka et al. | 260—555 |
| 3,488,293 | 1/1970 | Hong et al. | 260—555 X |

BERNARD HELFIN, Primary Examiner

M. W. GLYNN, Assistant Examiner